US008995727B2

(12) United States Patent
Ghuge et al.

(10) Patent No.: US 8,995,727 B2
(45) Date of Patent: Mar. 31, 2015

(54) IMAGE ADVOCACY IN PORTABLE COMPUTING DEVICES

(75) Inventors: Deepak R. Ghuge, Ahmednagar (IN); Dilipkumar S. Jha, Pune (IN); Sandeep R. Patil, Pune (IN); Eda Sasikanth, Vijayawada (IN)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 13/585,187

(22) Filed: Aug. 14, 2012

(65) Prior Publication Data

US 2014/0050369 A1 Feb. 20, 2014

(51) Int. Cl.
| G06K 9/00 | (2006.01) |
| H04N 1/21 | (2006.01) |
| H04N 21/4335 | (2011.01) |
| H04N 21/482 | (2011.01) |
| H04N 21/81 | (2011.01) |

(52) U.S. Cl.
CPC ......... *H04N 1/2195* (2013.01); *H04N 21/4335* (2013.01); *H04N 21/482* (2013.01); *H04N 21/8153* (2013.01); *H04N 2201/214* (2013.01); *H04N 2201/218* (2013.01)
USPC .......................................................... 382/115

(58) Field of Classification Search
None
See application file for complete search history.

(56) References Cited

U.S. PATENT DOCUMENTS

| 4,630,125 | A | 12/1986 | Roetling |
| 5,448,376 | A | 9/1995 | Ohta |
| 5,898,795 | A | 4/1999 | Bessho |
| 6,111,586 | A | 8/2000 | Ikeda et al. |
| 6,734,858 | B2 | 5/2004 | Attar et al. |
| 6,904,168 | B1 | 6/2005 | Steinberg et al. |
| 7,383,509 | B2 | 6/2008 | Foote et al. |
| 7,389,914 | B1 | 6/2008 | Enright et al. |
| 7,467,222 | B2 | 12/2008 | Kacker |
| 8,041,076 | B1 * | 10/2011 | Bourdev ....................... 382/103 |
| 2003/0123078 | A1 * | 7/2003 | Kazami ....................... 358/1.14 |
| 2006/0082672 | A1 | 4/2006 | Peleg |
| 2006/0123057 | A1 | 6/2006 | Zelenka et al. |
| 2008/0024799 | A1 * | 1/2008 | Tsujiuchi et al. .............. 358/1.2 |
| 2009/0263109 | A1 * | 10/2009 | Kihara et al. ................. 386/126 |
| 2009/0303347 | A1 | 12/2009 | Kwon et al. |
| 2010/0157095 | A1 * | 6/2010 | Karn et al. ................. 348/231.1 |
| 2010/0235323 | A1 | 9/2010 | Zhang et al. |
| 2011/0128414 | A1 | 6/2011 | Walker et al. |
| 2011/0258404 | A1 | 10/2011 | Arakawa et al. |
| 2012/0300259 | A1 * | 11/2012 | Hosaka et al. ............... 358/1.15 |

OTHER PUBLICATIONS

Automatic recognition of "good" candidates for deletion, of digital photos, IBM 2007.*

* cited by examiner

*Primary Examiner* — Vu Le
*Assistant Examiner* — Alexander J Lesnick
(74) *Attorney, Agent, or Firm* — Francis Lammes; Stephen J. Walder, Jr.; Randall J. Bluestone

(57) ABSTRACT

A mechanism is provided for identifying one or more eligible image candidates. Responsive to a determination that the storage of a recently captured image raising an allocated captured images memory space in a storage to a point that storage of a next captured image would raise the allocated captured images memory space in the storage above the predetermined threshold, a criteria group in a set of criteria groups is identified to utilize for identification of one or more images candidates from a set of stored images in the storage. The one or more images candidates from the set of stored images in the storage are identified utilizing one or more image identification criteria in the criteria group. The one or more image candidates are then presented to a user.

21 Claims, 3 Drawing Sheets

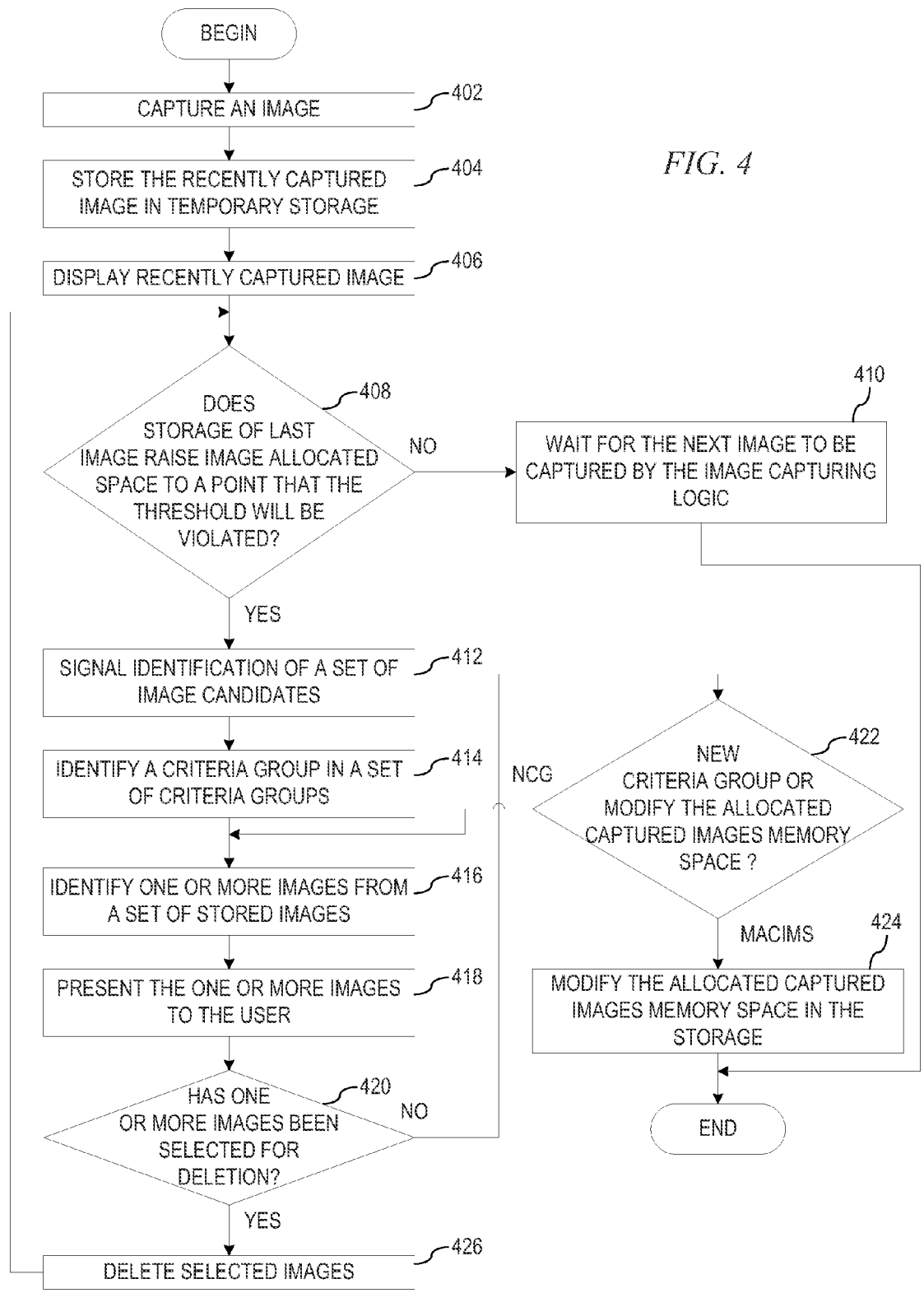

IMAGE ADVOCACY IN PORTABLE COMPUTING DEVICES

BACKGROUND

The present application relates generally to an improved data analysis apparatus and more specifically to mechanisms for utilizing an image advocate in portable computing devices.

Photography used to be performed by professional photographers, and people traveled many miles just to have their photograph taken by one of these professional photographers. However, currently, anyone with a portable device, such as a smart phone, digital camera, or the like, may take higher quality photographs wherever the user happens to be. That is, photos started from black & white with very little detail to the present photos of natural colors with amazing clarity based on the number of pixels currently utilized by the mobile device. Due to the rapid growth of communication technology mobile devices have matured to a mandatory utility to society. With regard to smart phones, along with basic functionality of vocal communication multiple applications, smart phones are embedded with short message service (SMS), image viewer, camera, wireless access protocol (WAP), blue-tooth, radio, synchronization with personal computer (PC), general packet radio system (GPRS), global positioning system (GPS), and the like, which have made smart phones more resourceful. Further, with the advent of Wi-Fi memory cards, digital cameras are now able to operate in a similar fashion.

Thus, users are now able to utilize mobile devices to capture each important moment of their life. However, the growth of memory capacity in mobile devices currently lags the ability of the mobile devices in capturing large number of photos. That is, due to the advent of mega-pixel camera enabled mobile devices, the photos captured by the mobile devices contain the characteristics of better quality, higher resolution, and off-course occupy larger memory sizes on the memory devices. Due to the hardware/performance limitations of the mobile devices, the memory within current mobile devices may not be expanded to hold all of the photos taken by a user. Therefore, memory management has become a key note in literature published by the vendors of the mobile devices and the error "Insufficient Memory" has become a common occurrence with no full-fledged solution on mobile consumer forums.

SUMMARY

In one illustrative embodiment, a method, in a data analysis system, is provided for identifying one or more eligible image candidates. The illustrative embodiment determines whether storage of a recently captured image raises an allocated captured images memory space in storage to a point that storage of next captured image would raise the allocated captured images memory space in the storage above a predetermined threshold. Responsive to the storage of the recently captured image raising the allocated captured images memory space in the storage to the point that storage of the next captured image would raise the allocated captured images memory space in the storage above the predetermined threshold, the illustrative embodiment identifies a criteria group in a set of criteria groups to utilize for identification of one or more images candidates from a set of stored images in the storage. Utilizing one or more image identification criteria in the criteria group, the illustrative embodiment identifies the one or more images candidates from the set of stored images in the storage. The illustrative embodiment presents the one or more image candidates to a user.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 depicts a flowchart of the operation performed by an image identification mechanism for identifying one or more eligible image candidates to a user to delete based on user selected criteria so that the recently captured image may be stored in accordance with an illustrative embodiment.

DETAILED DESCRIPTION

The illustrative embodiments provide for utilizing an image advocate in portable computing devices. That is, until such time to where memory capacity catches up the larger memory sizes required by mega-pixel camera enabled mobile devices, the illustrative embodiments provide image analysis logic in mobile devices that facilitates image memory management. When the situation arises that an image is captured but a mobile device suffers from lack of storage, the illustrative image analysis logic performs analysis of all or a portion of existing images on the mobile device in order to identify an eligible image candidate(s) for the user to delete based on user selected criteria so that the recently captured image may be stored.

Figure 1:
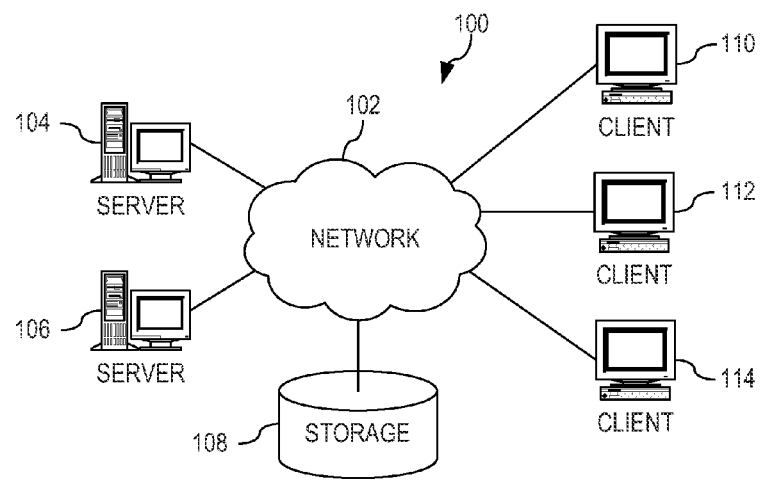
FIG. 1 is an example diagram of a distributed data processing system in which aspects of the illustrative embodiments may be implemented.
Figure 2:
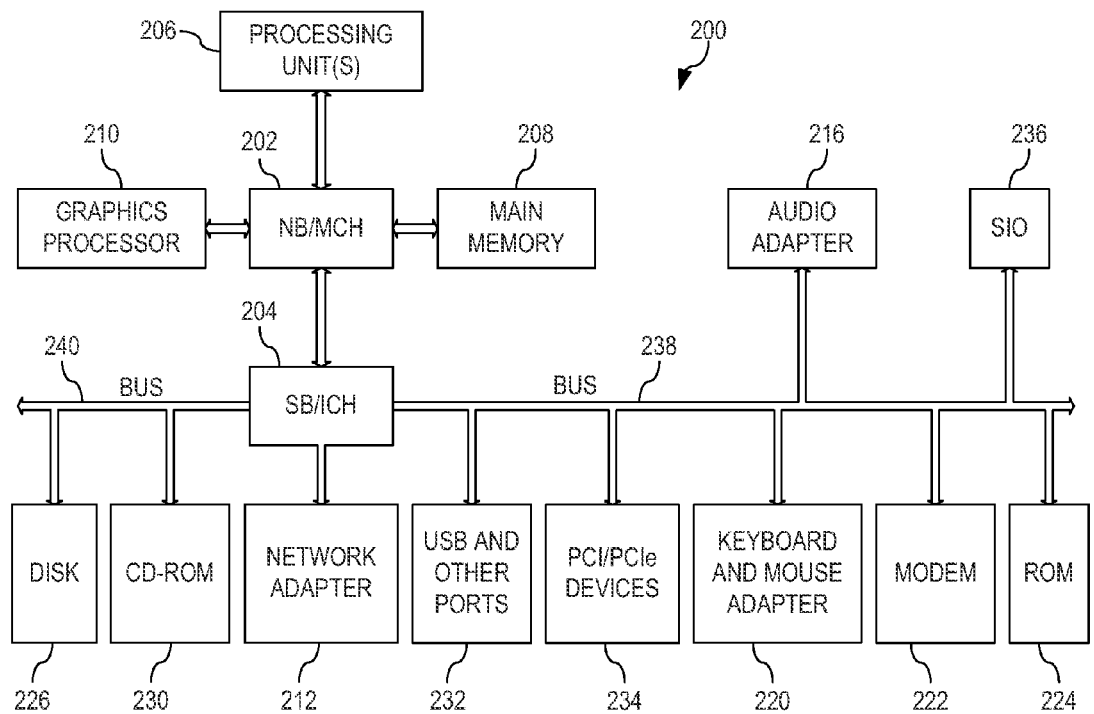
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, smart phone, telephone or other communication device, a personal digital assistant (PDA), a digital camera, or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
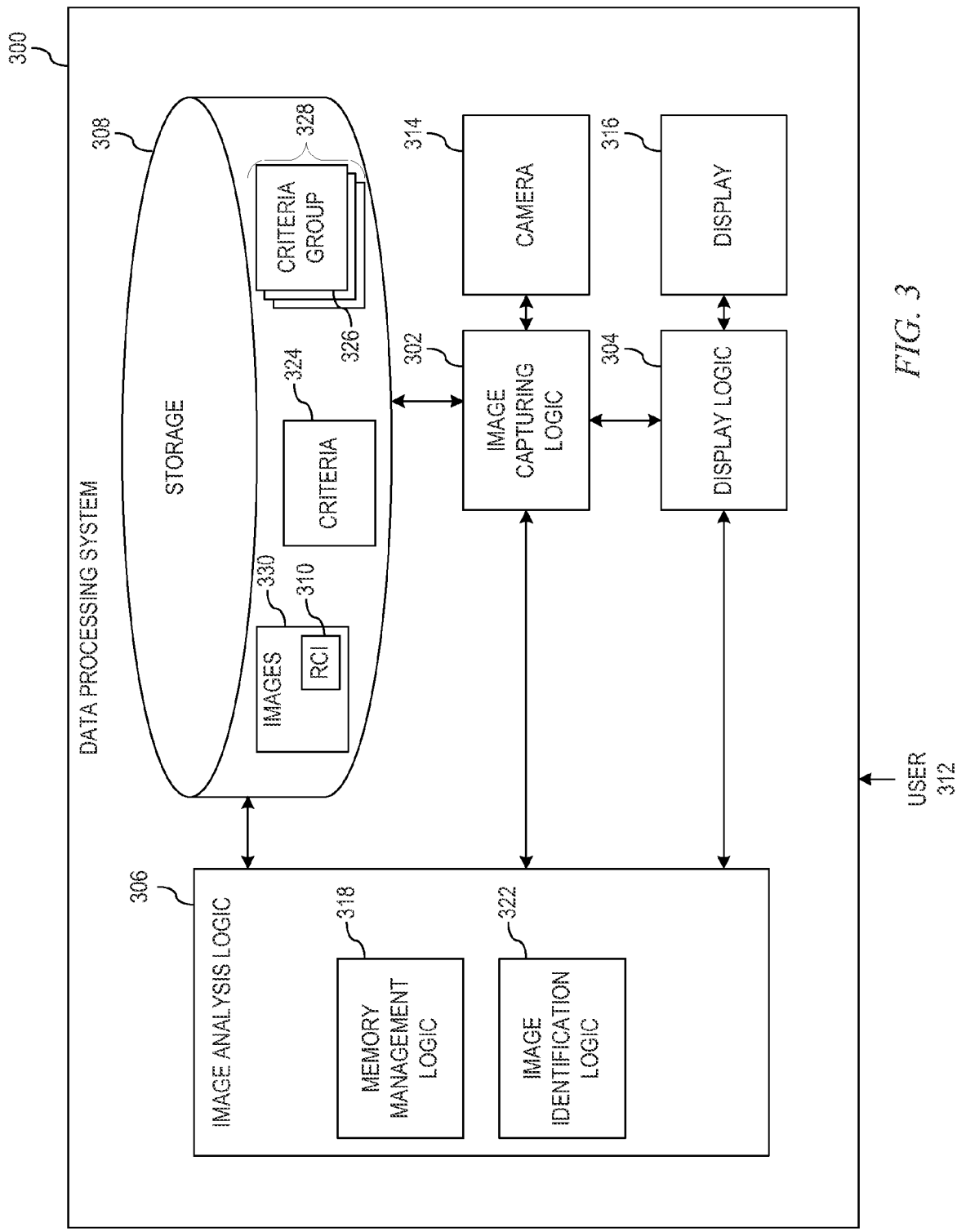
FIG. 3 depicts a function block diagram of an image identification mechanism for identifying one or more eligible image candidates to a user to delete based on user selected criteria so that the recently captured image may be stored in accordance with an illustrative embodiment.

FIG. 3 depicts a function block diagram of an image identification mechanism for identifying one or more eligible image candidates to a user to delete based on user selected criteria so that the recently captured image may be stored in accordance with an illustrative embodiment. Data processing system 300 comprises image capturing logic 302, display logic 304, image analysis logic 306, and storage 308. As user 312 utilizes data processing system 300 to capture an image, image capturing logic 302 captures the image identified through camera 314. Within data processing system 300, image capturing logic 302 stores recently captured image 310 in storage 308 as one of images 330. Image capturing logic 302 may also send recently captured image 310 to display logic 304 and display logic 304 may in turn display recently captured image 310 on display 316.

In accordance with the illustrative embodiment, after storing recently captured image 310 in storage 308, memory management logic 318 within image analysis logic 306 determines whether the storage of recently captured image 310 raises the allocated captured images memory space in storage 308 to a point that storage of another captured image would raise the allocated captured images memory space in storage 308 above a predetermined threshold. The predetermined threshold may be a variable threshold. That is, the predetermined threshold may vary dynamically depending on the storage size of embedded storage 308. Thus, user 312 may have configured storage 308 such that only a portion of storage 308 is allocated for the long-term storage of captured images. Thus, memory management logic 318 determines whether the long-term storage of recently captured image 310 raises the long-term storage of captured images 330 to a point that storage of another captured image would raise the allocated captured images memory space in storage 308 above the allocated portion (predetermined threshold) of storage 308 allocated for the long-term storage of captured images. If memory management logic 318 determines that the storage of recently captured image 310 fails to raise the long-term storage of captured images to the point that storage of another captured image would raise the allocated captured images memory space in storage 308 above the predetermined threshold, then memory management logic 318 waits for the next image to be captured by image capturing logic 302.

However, if memory management logic 318 determines that the storage of recently captured image 310 would raise the long-term storage of captured images to the point that storage of another captured image would raise the allocated captured images memory space in storage 308 above the predetermined threshold, then memory management logic 318 signals image candidate identification logic 322 to identify a set of image candidates for selection by user 312 to delete in order to make space for recently captured image 310. In order to identify a set of image candidates, image candidate identification logic 322 utilizes one or more image identification criteria 324. The one or more identification image criteria 324 may comprise:

Synchronization consideration—Images that have been synchronized with another computing device and are thus accessible by user 312 via the other computing device. Identification of such images may be based on a synchronization tag associated with the image indicating that the image has been synchronized.

Shared to social media/Web album consideration—Images that have been uploaded to a social media and/or Web album and are thus accessible by user 312 via the social media and/or Web album sites. Identification of such images may be based on a shared tag associated with the image indicating that the image has been shared.

Duplicate image consideration—Images that are the same but with same and/or different names. Identification of such images may be made by a pixel to pixel comparison between two or more images and identifying that the two or more images comprise the same image when the pixel by pixel comparison is above a predetermined threshold.

Poor quality consideration—Images that have a poor quality. Identification of such images may be made based on a pixel weight consideration based on one or more methods such as mean value calculation, medium calculation (pixel aggregative tests), wavelet transform calculation (to detect blur), or the like.

Shared to a trusted user consideration—Images that have been shared with a trusted user and are thus accessible by user 312 via contacting the trusted user. Identification of such images may be based on a trusted shared tag associated with the image indicating that the image has been shared.

Immutability consideration—Images that have an expiration date associated with the image. Identification of such images may be made based on an expiration tag associated with the image.

Personal versus generic consideration—Images that have a personal nature of a generic nature. Identification is made as to whether the image comprises an image of a personal importance, such as an image tagged with "wife", "son", or the like, or stored in a "Personal Images" directory versus images that are tagged with the name of a celebrity, a well-known building, or the like, or stored in a "Generic Images" directory.

Screen saver/wall paper consideration—Images that are currently being used for or have ever been used for screen saver or wall paper on the computing device. Identification may be made based on metadata associated with the image indicating whether or not the image has ever been or is currently being used as a screen saver and/or wall paper, thereby identifying images that have not been used as screen saver or wall paper on the computing device.

Same person(s) image consideration—Images that comprise images of the same person(s). Identification of such images may be made by using histogram analysis, Fourier transform, or the like, comparison between multiple images.

Same location image consideration—Images that comprise images of the same location. Identification of such images may be made by a pixel to pixel comparison between a location in one image and a location in one or more other images when the pixel by pixel comparison is above a predetermined threshold.

Image size consideration—Images that are larger in size than other images. Identification of such images may be made by a size comparison of one image to all other images and are above a predetermined threshold.

Grey-scale image consideration—Images that carry only intensity information, typically known as grey-scale images. Identification is made as to the intensity associated with the image. User 312 may choose to give preference to grey-scale images over color images or color images over grey-scale images.

Binary image consideration—Images that carry only binary pixel information, typically known as black and white images. Identification is made as to the image comprises on binary pixel information. User 312 may choose to give preference to black and white images over grey-scale and color images or grey-scale and color images over black and white images.

Occasional importance consideration—Images that carry special occasion context. Identification is made as to whether the image is tagged with an occasion tag, such as "birthday", "anniversary", or the like, or the image comprises any occasion context anywhere in the image, such as a birthday cake, a party sign, a lady in a wedding dress, or the like, thereby reducing the likelihood of selecting such an image.

Purchased or digital signature image consideration—Images that are purchased or digitally signed indicating a high value to user 312. Identification is made by verifying whether there is a purchased tag or a digital signature, thereby reducing the likelihood of selecting such an image.

Not-recently accessed consideration—Images that have not been recently accessed by user 312. Identification is made of these images that have not been recently accessed by user 312 based on date and time, with the oldest accessed images being identified.

Image age consideration—Images that are old. Identification is made based on age, identifying the oldest images as to be considered first.

Grouped image consideration—Images that are grouped together, such as collaged images. Identification is made of grouped images, thereby reducing the likelihood of selecting an image that has been grouped.

Modified image consideration—Images that have been modified/edited by the user, such as through eliminating red eye, cropping, or the like. Identification is made through a modified/edited tag, thereby reducing the likelihood that an image that has been modified/edited is selected.

Elder person in image consideration—Images that comprise elders, such as grandparents, parents, or the like. Identification is made based on tag user 312 associated with the image indicating grandparent, grandma/pa, dad, mom, or the like.

Rating-based consideration—Images that have been given a rating by user 312 or others. Identification is made as to whether the image has an associated rating below a predetermined threshold, such as 1-star.

Image format consideration—Images that a higher quality format over other formats based on a user-provided ranking of formats. Identification is made as to whether an image with a format is lower in the user-provided ranking is identified over images with formats that are higher in the user-provided ranking of formats. For example, user 312 may give preference of images with an xps format over an image with a bmp format. The user-provided ranking of formats provides an indication of the format preferences.

Identical image/different format consideration—Images that are identical based on a pixel-by-pixel comparison but have different formats. Identification is made that the images are the same based on the pixel-by-pixel comparison but, for example, one is a jpg format and the other is a tiff format. Since the tiff formatted image is larger in size, preference would be given to keeping the jpg formatted image since the jpg image is smaller in size and uses less storage space.

One or more of the above image identification criteria 324 may be selected by user 312 to be utilized by image candidate identification logic 322. If user 312 selects more than one of the above image identification criteria 324, then image candidate identification logic 322 prompts the user to provide a priority as to which criteria should be implemented first, second, third, etc. Once user 312 has completed selection and prioritization, image candidate identification logic 322 may store the grouping as a criteria group 326. Additionally, user 312 may store a plurality of criteria groups 328 so that the user may identify a different criteria group 326 for image candidate identification logic 322 to utilize if the images identified by a current criteria group does not identify an image that user 312 deems adequate to delete.

That is, once user identifies criteria group 326, which may comprise one or more criteria from image identification criteria 324, image candidate identification logic 322 utilizes one or more image identification criteria 324 in criteria group 326 to identify one or more images from images 330 in storage 308 for user 312 to select from in order to make space for the next captured image. Based on the applied criteria, image candidate identification logic 322 identifies one or more images from images 330 as well as provides a ranking to the images based on the applied criteria from criteria group 326. The identified and ranked one or more images may then be presented to user 312 via display logic 304 and display 316 in advance of user 312 attempting to capture a next image that will violate the predetermined threshold. If user 312 does deem any of the identified one or more images as one to delete, then user 312 may indicate that image candidate identification logic 322 utilize a different existing criteria group 326 from criteria groups 328 to utilize or build another criteria group 326 from one or more criteria in image identification criteria 324. Responsive to user 312 selecting an image from the identified one or more images as the one to delete, memory management logic 318 deletes the selected image from images 330.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing.

In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™ Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

FIG. 4 depicts a flowchart of the operation performed by an image identification mechanism for identifying one or more eligible image candidates to a user to delete based on user selected criteria so that the recently captured image may be stored in accordance with an illustrative embodiment. As the operation begins, image capturing logic, executed by a processor in a data processing system, captures an image identified through a camera (step 402). The image capturing logic stores the recently captured image in storage (step 404). The image capturing logic may also send recently captured image to display logic, executed by the processor, for display on a display coupled to the data processing system (step 406).

After storing the recently captured image, memory management logic, executed by the processor in the data processing system, determines whether the storage of the recently captured image raises an allocated captured images memory space in the storage to a point that storage of another captured image would raise the allocated captured images memory space in the storage above a predetermined threshold (step 408). If at step 408 the memory management logic determines that the storage of the recently captured image fails to raise the long-term storage of captured images to the point that storage of another captured image would raise the allocated captured images memory space in the storage above the predetermined threshold, then the memory management logic waits for the next image to be captured by the image capturing logic (step 410), with the operation terminating thereafter.

However, if at step 408 the memory management logic determines that the storage of the recently captured image raises the long-term storage of captured images to the point that storage of another captured image would raise the allocated captured images memory space in the storage above the predetermined threshold, then the memory management logic signals image candidate identification logic, executed by the processor, to identify a set of image candidates for selection by the user to delete in order to make space for the recently captured image (step 412). The image candidate identification logic identifies a criteria group in a set of criteria groups to utilize for identification of one or more images from a set of stored images in the storage (step 414). The image candidate identification logic utilizes one or more image identification criteria in the criteria group to identify one or more images from a set of stored images in the storage (step 416). The image candidate identification logic initiates presentation of the one or more images to the user (step 418).

The image candidate identification logic then determines whether the user has selected one or more of the one or more images (step 420). If at step 420 the user declines to select an image from the one or more images, then image candidate identification logic prompts the user to select another criteria group or modify the allocated captured images memory space in the storage (step 422). If at step 422 the user chooses to modify the allocated captured images memory space in the storage, then the memory management logic modifies the allocated captured images memory space in the storage (step 424), with the operation terminating thereafter. If at step 422 the user selects a new criteria group, then the operation returns to step 416. If at step 420 the user selects one or more of the one or more images, then the memory management logic deletes the selected one or more images (step 426), with the operation proceeding to step 408.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for provide for utilizing an image advocate in portable computing devices. That is, until such time to where memory capacity catches up the larger memory sizes required by mega-pixel camera enabled mobile devices, the illustrative embodiments provide image analysis logic in mobile devices that facilitates image memory management. When the situation arises when an image is captured but a mobile device suffers from lack of storage, the illustrative image analysis logic performs analysis of all or a portion of existing images on the mobile device in order to identify an eligible image candidate(s) for the user to delete based on user selected criteria so that the recently captured image may be stored.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for identifying one or more eligible image candidates, the method comprising:
determining, by a processor, whether storage of a recently captured image raises an allocated captured images memory space in a storage to a first threshold that storage of a next captured image would raise the allocated captured images memory space in the storage above a second threshold, wherein the first threshold is a threshold less than a maximum memory capacity of the storage and wherein the second threshold is greater than the first threshold and less than the maximum memory capacity of the storage;
responsive to the storage of the recently captured image raising the allocated captured images memory space in the storage to the first threshold that storage of the next captured image would raise the allocated captured images memory space in the storage above the second threshold, identifying, by the processor, a criteria group in a set of criteria groups to utilize for identification of one or more images candidates from a set of stored images in the storage;
utilizing one or more image identification criteria in the criteria group, identifying, by the processor, the one or more images candidates from the set of stored images in the storage; and
presenting, by the processor, the one or more image candidates to a user, wherein the presenting occurs prior to the acquisition of the next captured image.

2. The method of claim 1, further comprising:
responsive to the user selecting one or more of the one or more image candidates to delete thereby forming a selected one or more images, deleting, by the processor, the selected one or more images from the storage.

3. The method of claim 1, further comprising:
responsive to the user declining selection of one or more of the one or more image candidates to delete, determining, by the processor, whether the user has indicated to apply a different criteria group in the set of criteria groups to utilize for identification of one or more images candidates from the set of stored images in the storage;
responsive to the user indicating the use of the different criteria group, identifying, by the processor, the one or more images candidates from the set of stored images in the storage utilizing one or more image identification criteria in the different criteria group; and
presenting, by the processor, the one or more image candidates to a user.

4. The method of claim 1, further comprising:
responsive to the user declining selection of one or more of the one or more image candidates to delete, determining, by the processor, whether the user has indicated to modify the allocated captured images memory space in the storage; and
responsive to the user indicating modification of the allocated captured images memory space in the storage, modifying, by the processor, the allocated captured images memory space in the storage.

5. The method of claim 1, wherein presenting the one or more image candidates to the user comprises:
presenting, by the processor, two or more image candidates to the user in an ordered list, wherein the ordered list is ordered based on a priority associated with each image identification criteria in the one or more image identification criteria in the criteria group, wherein the two or more image candidates meet at least one image identification criteria in the one or more image identification criteria, and wherein each image in the two or more image candidates are prioritized based on the at least one image identification criteria.

6. The method of claim 1, wherein each criteria group in the set of criteria groups comprises at least one image identification criteria and wherein, when a criteria group comprises two or more image identification criteria, each image identification criteria has a different user identified criteria.

7. The method of claim 1, wherein the at least one image identification criteria is at least one of:
a synchronization consideration;
shared to social media/Web album consideration;
a duplicate image consideration;
a poor quality consideration;
a shared to a trusted user consideration;
an immutability consideration;
a personal versus generic consideration;
a screen saver/wall paper consideration;
a same person(s) image consideration;
a same location image consideration;
an image size consideration;
a grey-scale image consideration;
a color image consideration;
a binary image consideration;
an occasional importance consideration;
a purchased or digital signature image consideration;
a not-recently accessed consideration;
an image age consideration;
a grouped image consideration;
a modified image consideration;
an elder person in image consideration;
a rating-based consideration;
an imagine format consideration; or
an identical image/different format consideration.

8. A computer program product comprising a computer readable storage medium having a computer readable program stored therein, wherein the computer readable program, when executed on a computing device, causes the computing device to:
determine whether storage of a recently captured image raises an allocated captured images memory space in a storage to a first threshold that storage of a next captured image would raise the allocated captured images memory space in the storage above a second threshold, wherein the first threshold is a threshold less than a maximum memory capacity of the storage and wherein the second threshold is greater than the first threshold and less than the maximum memory capacity of the storage;
responsive to the storage of the recently captured image raising the allocated captured images memory space in the storage to the first threshold that storage of the next captured image would raise the allocated captured images memory space in the storage above the second threshold, identify a criteria group in a set of criteria groups to utilize for identification of one or more images candidates from a set of stored images in the storage;
utilizing one or more image identification criteria in the criteria group, identify the one or more images candidates from the set of stored images in the storage; and
present the one or more image candidates to a user, wherein the presenting occurs prior to the acquisition of the next captured image.

9. The computer program product of claim 8, wherein the computer readable program further causes the computing device to:
responsive to the user selecting one or more of the one or more image candidates to delete thereby forming a selected one or more images, delete the selected one or more images from the storage.

10. The computer program product of claim 8, wherein the computer readable program further causes the computing device to:
responsive to the user declining selection of one or more of the one or more image candidates to delete, determine whether the user has indicated to apply a different criteria group in the set of criteria groups to utilize for identification of one or more images candidates from the set of stored images in the storage;
responsive to the user indicating the use of the different criteria group, identify the one or more images candidates from the set of stored images in the storage utilizing one or more image identification criteria in the different criteria group; and
present the one or more image candidates to a user.

11. The computer program product of claim 8, wherein the computer readable program further causes the computing device to:
responsive to the user declining selection of one or more of the one or more image candidates to delete, determine whether the user has indicated to modify the allocated captured images memory space in the storage; and
responsive to the user indicating modification of the allocated captured images memory space in the storage, modify the allocated captured images memory space in the storage.

12. The computer program product of claim 8, wherein the computer readable program to present the one or more image candidates to the user further causes the computing device to:
present two or more image candidates to the user in an ordered list, wherein the ordered list is ordered based on a priority associated with each image identification criteria in the one or more image identification criteria in the criteria group, wherein the two or more image candidates meet at least one image identification criteria in the one or more image identification criteria, and wherein each image in the two or more image candidates are prioritized based on the at least one image identification criteria.

13. The computer program product of claim 8, wherein each criteria group in the set of criteria groups comprises at least one image identification criteria and wherein, when a criteria group comprises two or more image identification criteria, each image identification criteria has a different user identified criteria.

14. The computer program product of claim 8, wherein the at least one image identification criteria is at least one of:
a synchronization consideration;
a shared to social media/Web album consideration;
a duplicate image consideration;
a poor quality consideration;
a shared to a trusted user consideration;
an immutability consideration;
a personal versus generic consideration;
a screen saver/wall paper consideration;
a same person(s) image consideration;
a same location image consideration;
an image size consideration;
a grey-scale image consideration;
a color image consideration;
a binary image consideration;
an occasional importance consideration;
a purchased or digital signature image consideration;

a not-recently accessed consideration;
an image age consideration;
a grouped image consideration;
a modified image consideration;
an elder person in image consideration;
a rating-based consideration;
an image format consideration; or
an identical image/different format consideration.

15. An apparatus, comprising:
a processor; and
a memory coupled to the processor, wherein the memory comprises instructions which, when executed by the processor, cause the processor to:
determine whether storage of a recently captured image raises an allocated captured images memory space in a storage to a first threshold that storage of a next captured image would raise the allocated captured images memory space in the storage above a second threshold, wherein the first threshold is a threshold less than a maximum memory capacity of the storage and wherein the second threshold is greater than the first threshold and less than the maximum memory capacity of the storage;
responsive to the storage of the recently captured image raising the allocated captured images memory space in the storage to the first threshold that storage of the next captured image would raise the allocated captured images memory space in the storage above the second threshold, identify a criteria group in a set of criteria groups to utilize for identification of one or more images candidates from a set of stored images in the storage;
utilizing one or more image identification criteria in the criteria group, identify the one or more images candidates from the set of stored images in the storage; and
present the one or more image candidates to a user, wherein the presenting occurs prior to the acquisition of the next captured image.

16. The apparatus of claim 15, wherein the instructions further cause the processor to:
responsive to the user selecting one or more of the one or more age candidates to delete thereby forming a selected one or more images, delete the selected one or more images from the storage.

17. The apparatus of claim 15, wherein the instructions further cause the processor to:
responsive to the user declining selection of one or more of the one or more image candidates to delete, determine whether the user has indicated to apply a different criteria group in the set of criteria groups to utilize for identification of one or more images candidates from the set of stored images in the storage;
responsive to the user indicating the use of the different criteria group, identify the one or more images candidates from the set of stored images in the storage utilizing one or more image identification criteria in the different criteria group; and
present the one or more image candidates to a user.

18. The apparatus of claim 15, wherein the instructions further cause the processor to:
responsive to the user declining selection of one or more of the one or more image candidates to delete, determine whether the user has indicated to modify the allocated captured images memory space in the storage; and
responsive to the user indicating modification of the allocated captured images memory space in the storage, modify the allocated captured images memory space in the storage.

19. The apparatus of claim 15, wherein the instructions to present the one or more image candidates to the user further cause the processor to:
present two or more image candidates to the user in an ordered list, wherein the ordered list is ordered based on a priority associated with each image identification criteria in the one or more image identification criteria in the criteria group, wherein the two or more image candidates meet at least one image identification criteria in the one or more image identification criteria, and wherein each image in the two or more image candidates are prioritized based on the at least one image identification criteria.

20. The apparatus of claim 15, wherein each criteria group in the set of criteria groups comprises at least one image identification criteria and wherein, when a criteria group comprises two or more image identification criteria, each image identification criteria has a different user identified criteria.

21. The apparatus of claim 15, wherein the at least one image identification criteria is at least one of;
a synchronization consideration;
a shared to social media/Web album consideration;
a duplicate image consideration;
a poor quality consideration;
a shared to a trusted user consideration;
an immutability consideration;
a personal versus generic consideration;
a screen saver/wall paper consideration;
a same person(s) image consideration;
a same location image consideration;
an image size consideration;
a grey-scale image consideration;
a color image consideration;
a binary image consideration;
an occasional importance consideration;
a purchased or digital signature image consideration;
a not-recently accessed consideration;
an image age consideration;
a grouped image consideration;
a modified image consideration;
an elder person in image consideration;
a rating-based consideration;
an image format consideration; or
an identical image/different format consideration.

* * * * *